United States Patent
Masui et al.

(10) Patent No.: US 11,467,277 B2
(45) Date of Patent: Oct. 11, 2022

(54) OBJECT RECOGNITION APPARATUS AND OBJECT RECOGNITION METHOD

(71) Applicants: DENSO CORPORATION, Kariya (JP); TOYOTA JIDOSHA KABUSHIKI KAISHA, Toyota (JP)

(72) Inventors: Yohei Masui, Kariya (JP); Tadashi Sakai, Kariya (JP); Takashi Maeda, Nagoya (JP); Takeshi Nanami, Toyota (JP); Minoru Nakadori, Toyota (JP)

(73) Assignees: DENSO CORPORATION, Kariya (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 544 days.

(21) Appl. No.: 16/089,121

(22) PCT Filed: Mar. 29, 2017

(86) PCT No.: PCT/JP2017/013117
§ 371 (c)(1),
(2) Date: Sep. 27, 2018

(87) PCT Pub. No.: WO2017/170798
PCT Pub. Date: Oct. 5, 2017

(65) Prior Publication Data
US 2019/0293758 A1    Sep. 26, 2019

(30) Foreign Application Priority Data
Mar. 31, 2016   (JP) .............................. JP2016-072803

(51) Int. Cl.
*G01S 13/86*     (2006.01)
*G01S 7/41*      (2006.01)
*G08G 1/16*      (2006.01)

(52) U.S. Cl.
CPC .............. *G01S 13/867* (2013.01); *G01S 7/41* (2013.01); *G08G 1/16* (2013.01)

(58) Field of Classification Search
CPC . G01S 7/41; G01S 13/86; G01S 13/93; G01S 13/867; G01S 13/931; B60R 21/00; G08G 1/16
See application file for complete search history.

(56) References Cited

U.S. PATENT DOCUMENTS 8,447,472 B2 *  5/2013  Joh ....................... G01S 13/723
                                                 701/45
9,481,365 B2 * 11/2016  Tokoro .................. B60W 50/00
(Continued)

FOREIGN PATENT DOCUMENTS

JP   2010-151621 A   7/2010
JP   2015-132553 A   7/2015

*Primary Examiner* — Matthew M Barker
(74) *Attorney, Agent, or Firm* — Maschoff Brennan (57) ABSTRACT

An object recognition apparatus groups reflection points detected by a radar device, and recognizes an object around the own vehicle, based on a radar-based target detected using the grouped plurality of reflection points and an image-based target detected using an image captured by an image capturing device. The object recognition apparatus includes a reflection point acquiring unit that acquires reflection point information related to the grouped plurality of reflection points, and an object determining unit that determines that a plurality of objects have been detected as a single object by the radar device, based on the reflection point information acquired by the reflection point acquiring unit and the information on the image-based target, if the image-based target detected by the imaging device includes an image-only target not detected by the radar device.

16 Claims, 4 Drawing Sheets

(56) References Cited

U.S. PATENT DOCUMENTS

| | | | |
|---|---|---|---|
| 2003/0011509 A1* | 1/2003 | Honda | G01S 13/931 342/70 |
| 2006/0274149 A1* | 12/2006 | Yoshizawa | G01S 13/867 348/148 |
| 2007/0168128 A1* | 7/2007 | Tokoro | B60R 21/013 701/301 |
| 2007/0171121 A1* | 7/2007 | Munakata | G06K 9/00805 342/55 |
| 2012/0140061 A1* | 6/2012 | Zeng | G01S 13/867 348/135 |
| 2014/0104408 A1* | 4/2014 | Nanba | H04N 7/188 348/119 |

* cited by examiner

OBJECT RECOGNITION APPARATUS AND OBJECT RECOGNITION METHOD

CROSS REFERENCE TO RELATED APPLICATIONS

The present application is a national stage application under 35 U.S.C. § 371(c) of PCT Application No. PCT/JP2017/013117, filed on Mar. 29, 2017, which is based on Japanese Patent Application No. 2016-072803, filed Mar. 31, 2016, the entire contents of which are incorporated herein by reference.

TECHNICAL FIELD

The present disclosure relates to an object recognition apparatus and an object recognition method, and more particularly, to an object recognition apparatus and an object recognition method applied to a vehicle to which a radar device and an imaging device are mounted as object detection sensors.

BACKGROUND ART

In an apparatus proposed for recognizing objects (e.g., see PTL 1), reflected waves received by a radar device, such as a millimeter wave radar or a laser radar, are used as a basis for detecting a plurality of reflection points. Of the plurality of reflection points detected based on the reflected waves, those which satisfy a predetermined condition are grouped as reflection points reflected by the same object, and using the information derived from the grouped plurality of reflection points, objects around the own vehicle are recognized.

In the apparatus described in PTL 1, a reflection point at the right end and a reflection point at the left end are extracted from the plurality of reflection points detected by the radar device, and a representative point representing an object is calculated based on the right- and left-end reflection points. Further, variations of the right- and left-end reflection points and the representative point are respectively calculated. If these variations satisfy a predetermined condition, an estimated width of the object is calculated based on the right- and left-end reflection points. Then, the grouping of the reflection points is corrected based on the estimated width. Thus, the occurrence of erroneous grouping is ensured to be prevented, which would otherwise occur by determining a group of reflection points spanning over a plurality of objects as being a single object.

CITATION LIST

Patented Literature

[PTL]: JP 2015-132553 A

SUMMARY OF THE INVENTION

Since the apparatus of PTL 1 obtains variations of the right- and left-end reflection points and the representative point, some time is taken for calculating the estimated width of the object. Therefore, it is difficult to correct the grouping of reflection points at the initial stage of detecting an object, in the case where the vehicle catches up with vehicles running parallel to each other at a distance. Furthermore, there is a concern that driving support will not be appropriately implemented if the object detection based on the erroneous grouping is applied, for example, to following travel control or collision avoidance control relative to the preceding vehicle.

The present disclosure has been made in view of the issues set forth above and has an object of providing an object recognition apparatus and an object recognition method enabling a quick determination that a radar device has detected a plurality of objects as a single object.

To solve the above issues, the present disclosure adopts the following configuration.

In a first aspect of the present disclosure, there is provided an object recognition apparatus that groups reflection points detected by a radar device, and recognizes an object around an own vehicle, based on a radar-based target that is detected using the grouped plurality of reflection points and an image-based target that is detected using an image captured by an imaging device. The apparatus includes a reflection point acquiring unit and an object determining unit. The reflection point acquiring unit acquires reflection point information that is information related to the grouped plurality of reflection points. The object determining unit determines that a plurality of objects have been detected as a single object by the radar device, based on the reflection point information acquired by the reflection point acquiring unit and the information on the image-based target, if the image-based target detected by the imaging device includes an image-only target that is a target not detected by the radar device.

In the above configuration, information on a plurality of reflection points that have been grouped are acquired, and the plurality of objects are determined to have been detected by the radar device as a single object, based on the acquired reflection point information and the image-based target information. When there are reflections from a plurality of vehicles running parallel to each other at a distance, the radar device may erroneously detect the plurality of vehicles as a single object. In this case, if the plurality of vehicles running parallel to each other at a distance are detected as a plurality of objects by the imaging device, and if the plurality of reflection points grouped as reflections from a single object are related to a plurality of image-based targets, it may be determined that a plurality of objects have been detected as a single object by the radar device. With the above configuration provided based on these standpoints, a plurality of objects are highly accurately determined as to whether they have been detected as a single object by the radar device. With the configuration of making a determination based on the combination of the radar-based target information with the image-based target information, a quick determination can be made as to whether a plurality of objects have been detected as a single object by the radar device, following detection of the objects by the radar device and the imaging device.

BRIEF DESCRIPTION OF THE DRAWINGS

Referring to the accompanying drawings, specific description will be provided below to clarify the above object and other objects, characteristics and advantageous effects of the present disclosure. In the drawings.

DESCRIPTION OF EMBODIMENTS

With reference to the drawings, some embodiments will be described. In the following embodiments, components that are the same or equivalent to each other are denoted by the same reference signs in the drawings. For repeated components having the same reference sign, descriptions elsewhere in the specification should be referred to.

Figure 1:
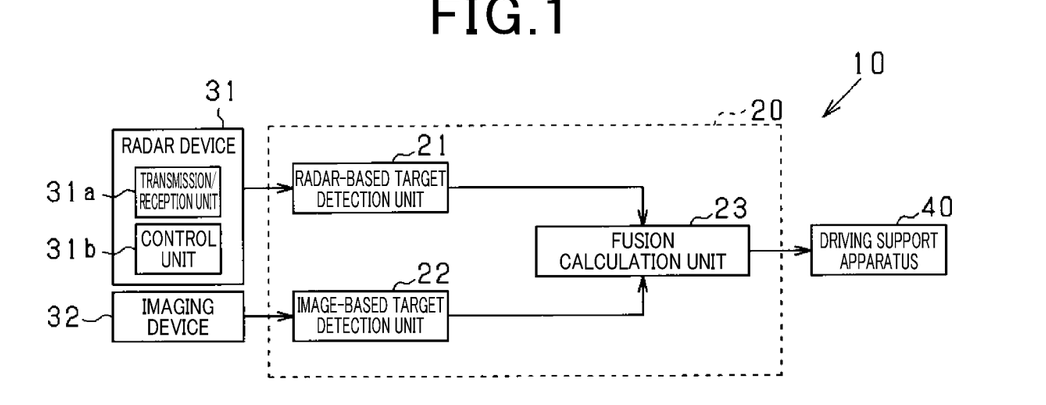
FIG. 1 is a schematic block diagram illustrating a configuration of a driving support system.

FIG. 1 shows a driving support system 10 of the present embodiment, which is mounted to a vehicle to recognize objects around the vehicle, and executes various driving supports based on the recognition of the objects. Accordingly, the system 10 serves, for example, as an auto cruise control system (ACC) that allows the vehicle to run following a vehicle running in the same lane, a pre-crash safety system (PCS) that performs various controls for avoiding collision with an object or reducing collision damage, or the like. As shown in FIG. 1, the driving support system 10 includes an object recognition apparatus 20, various sensors, and a driving support apparatus 40.

The object recognition apparatus 20 is a computer including a CPU, ROM, RAM, an I/O unit, and the like. The CPU executes programs installed in the ROM to perform functions for recognizing objects around the vehicle. The object recognition apparatus 20 is connected to a radar device 31 and an imaging device 32, which are object detection sensors, and receives inputs of detection results of objects from these sensors.

The radar device 31 is a detection device that detects objects by transmitting electromagnetic waves as transmission waves and receiving reflected waves thereof. In the present embodiment, the radar device 31 is constituted by a known millimeter-wave radar that uses high-frequency signals in a millimeter-wave band as transmission waves. The radar device 31 is attached to a front end portion of the vehicle, and transmits radar signals to scan a region extending over a predetermined angular range ahead of the vehicle centering on the optical axis. Further, the radar device 31 produces distance measurement data based on the time taken from when the electromagnetic waves are transmitted ahead of the vehicle until when the reflected waves are received, and sequentially outputs this distance measurement data to the object recognition apparatus 20. The distance measurement data includes information on the azimuth in which the object is present, the distance to the object, and the relative speed of the object.

Specifically, the radar device 31 includes a transmission/reception unit 31a for transmitting electromagnetic waves and receiving reflected waves, and a control unit 31b. The control unit 31b detects a plurality of reflection points based on the reflected waves received by the transmission/reception unit 31a, and groups the detected plurality of reflection points, based on a predetermined condition. Thus, a target ahead of the own vehicle is recognized as one target. The control unit 31b calculates a representative point representing a target, based on the plurality of reflection points in each group, for each target recognized through grouping. The representative point may be one point selected from the plurality of reflection points in a group (e.g., an intermediate point, a left-end point, or a right-end point of the plurality of reflection points), or may be a midpoint between the left- and right-end points. The control unit 31b calculates the relative position, the relative speed, and the azimuth of the target recognized through grouping, as distance measurement data, based on the distances, the speeds, and the azimuths of the plurality of reflection points relative to the own vehicle. The control unit 31b outputs reflection point information as distance measurement data to the object recognition apparatus 20, together with coordinates of the representative point. The reflection point information includes group-basis information on distances from the representative point to the respective plurality of reflection points.

The imaging device 32 is an in-vehicle camera, and includes a monocular camera such as a CCD camera, a CMOS image sensor, or a near-infrared camera. The imaging device 32 is attached to the vehicle at a predetermined level so as to be located at the center of the vehicle in the lateral direction, and captures an image, which is converted to have a bird's eye viewpoint, of a region extending ahead of the vehicle over a predetermined angular range. The imaging device 32 sequentially outputs the captured image data to the object recognition apparatus 20.

The object recognition apparatus 20 sequentially receives inputs of the distance measurement data from the radar device 31 and the image data from the imaging device 32, and recognizes objects using the inputted data. The object recognition apparatus 20 includes a radar-based target detection unit 21, an image-based target detection unit 22, and a fusion calculation unit 23.

The radar-based target detection unit 21 receives an input of distance measurement data from the radar device 31, and identifies the object detected using the inputted distance measurement data, as a radar-based target. The position of the radar-based target relative to the own vehicle is detected by applying the position information of the identified radar-based target to the xy plane. In the present embodiment, the lateral direction of the own vehicle is taken to be the x-axis, and the longitudinal direction thereof is taken to be the y-axis. In the present embodiment, the position information of the representative point P is plotted in the xy plane, and the radar search region is set in an area including the representative point P, as an area including the position of the radar-based target. The radar search region is set based on the detection characteristics of the radar device 31. The set region has being considered about an error due to the detection characteristics of the radar device 31. In the present embodiment, the radar-based target detection unit 21 serves as a reflection point acquiring unit.

The image-based target detection unit 22 identifies, as an image-based object, the object detected by analyzing the image data, and detects the position of the image-based target relative to the own vehicle by plotting the position information of the identified image-based target in the xy plane. The image-based target detection unit 22 performs pattern matching for the image-based target using a predetermined pattern, and identifies the type of the object, e.g., a vehicle, a pedestrian, or a bicycle, detected by the imaging device 32. The image-based target detection unit 22 generates azimuth angle information as information indicating the position of the target that has been recognized in the image, relative to the own vehicle. For example, when a vehicle is detected as an object present ahead of the vehicle, the image-based target detection unit 22 calculates, as an image angle width Wϕ, an angle formed by a line segment connecting the left end of the vehicle running ahead to the reference point 0, and a line segment connecting the right end of the vehicle running ahead to the reference point 0. Reference point 0 indicates the position of the own vehicle. The image-based target detection unit 22 sets an image search region as an area including the position of the image-based target. The image search region is set based on the detection characteristics of the imaging device 32. The set area has being considered about an error due to the detection characteristics of the imaging device 32.

There may be a combination of radar- and image-based targets satisfying a predetermined positional relationship, based on which these targets can be determined to be attributed to the same object, among the radar- and image-based targets obtained respectively from the radar- and image-based target detection units 21 and 22. If there is such a combination, the fusion calculation unit 23 combines fuses) the radar-based target information with the image-based target information in the combination, thereby generating a fusion target as a combined target. In the present embodiment, the image-based target detection unit 22 extracts a combination that includes an overlap between the radar search region set by the radar-based target detection unit 21 and the image search region set by the image-based target detection unit 22, and determines the radar- and image-based targets of the extracted combination as being an identical object.

Furthermore, the distance detected by the radar device 31 (termed millimeter wave distance hereinafter) is set as a distance to the fusion target. At the same time, the lateral position and the lateral width of the fusion target are detected using the distance information of the radar-based target and the azimuth angle information of the image-based target. The lateral position refers to a position in the lateral direction of the vehicle (x-axis direction) with respect to the reference point 0. The information related to the generated fusion target is outputted to the driving support apparatus 40. The characteristics of the radar device 31 and the imaging device 32 are utilized through such fusion processing to improve recognition accuracy of an object.

The driving support apparatus 40 receives an input of the fusion target information generated by the fusion calculation unit 23, and uses the inputted information as a basis to implement various driving support controls by controlling, for example, a brake device, a steering device, a seat belt activation device, an alarm device, or the like.

Sensors, such as millimeter wave radar, for detecting the presence of an object by radio waves have a resolution limit and thus suffer from difficulty in separately detecting a plurality of vehicles running parallel to with each other ahead of the own vehicle, particularly when far away from the own vehicle. Therefore, the plurality of vehicles running parallel to each other may be erroneously detected as a single object. Erroneous detection of a plurality of objects as a single object may lead to lowering of object recognition accuracy. Therefore, there is a concern that driving support such as following travel control or collision avoidance control relative to the preceding vehicle will not be appropriately performed.

Figure 2:
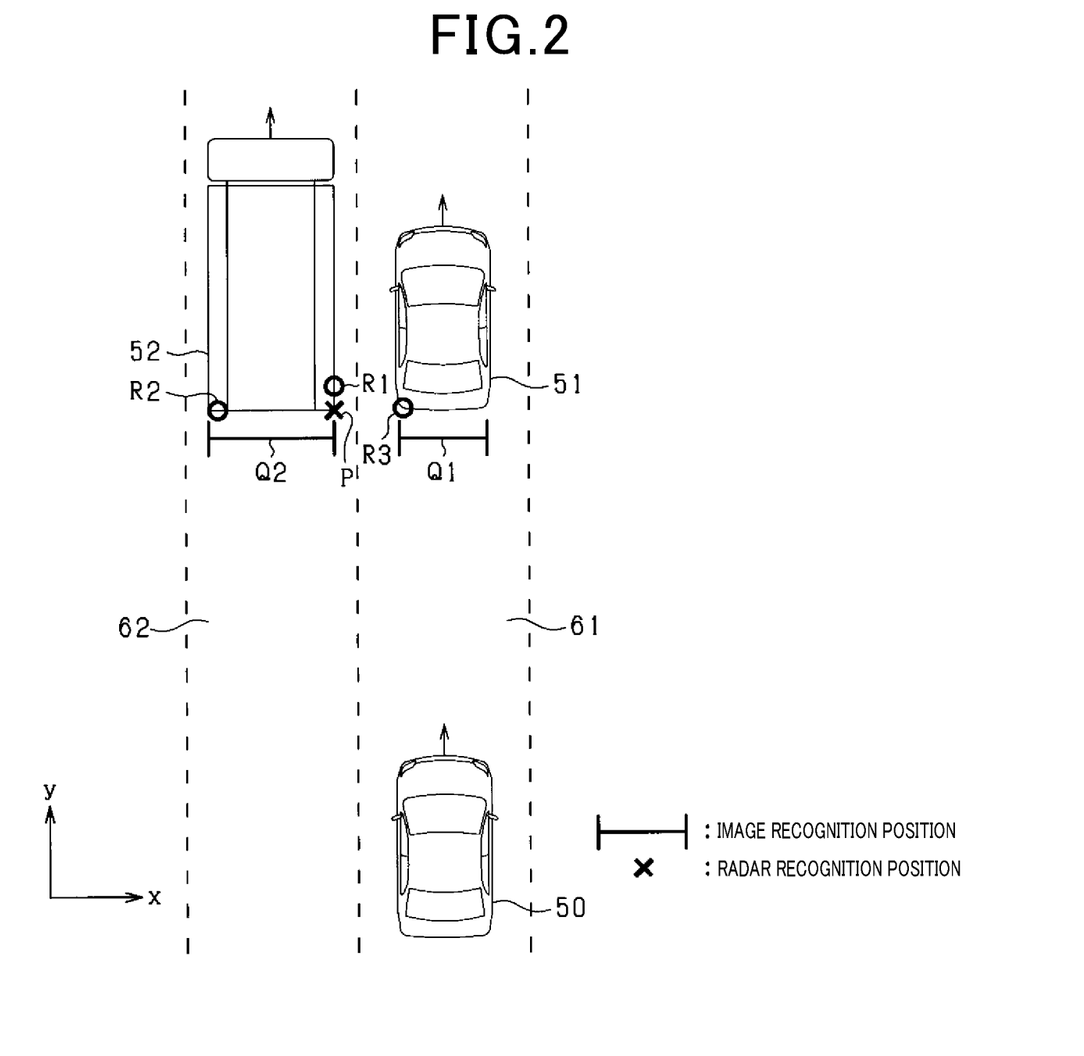
FIG. 2 is a diagram illustrating object detection performed by a radar device 31 and also illustrating fusion.

For example, assume a situation, as shown in FIG. 2, that a preceding vehicle 51 running in an own lane 61 is present ahead of the own vehicle 50, and an adjacent vehicle 52 (e.g., a large vehicle) is running in an adjacent lane 62 so as to be parallel to the preceding vehicle 51. In FIG. 2, R1 to R3 indicate a plurality of reflection points recognized through grouping as being attributed to a single object, and P indicates a point representing the plurality of reflection points R1 to R3. Q1 indicates the image recognition position of the preceding vehicle 51 recognized by the imaging device 32, and Q2 indicates the image recognition position of the adjacent vehicle 52.

When erroneous grouping is performed in spite of the transmission/reception unit 31a receiving reflected waves from both the preceding vehicle 51 and the adjacent vehicle 52, the millimeter wave output of the radar device 31 may correspond to only one vehicle. In this case, the number of image-based targets is two, whereas the number of radar-based targets is one. Further, a fusion target is generated based on the positional relationship between the image-based targets and the radar-based target. In FIG. 2, the radar-based target corresponding to the representative point P is fused with the image-based target corresponding to the adjacent vehicle 52. The preceding vehicle 51 becomes an image-only target and no fusion target is generated for the preceding vehicle 51. In such a case, there is a concern that the recognition reliability of the preceding vehicle 51 cannot be sufficiently ensured, or, depending on the control specification, the preceding vehicle 51 does not necessarily become a controlled object for driving support.

Therefore, in the present embodiment, if the image-based targets detected by the imaging device 32 include one that is not accurately detected by the radar device 31 (image-only target), it is determined that the radar device 31 has detected a plurality of objects as a single object, based on the reflection point information of a plurality of reflection points and the image-based target information. If it is determined that the radar device 31 has erroneously detected a plurality of objects as a single object, the distance information of the radar-based target is combined with the lateral position information of an image-only target, so that the recognition accuracy of the object corresponding to the image-only target is ensured to be improved. More specifically, if it is determined that the radar device 31 has detected a plurality of objects as a single object, an image-only target, which would not originally have been fused with a radar-based target, is fused with the radar-based target detected by the radar device 31. The process of combining each of two image-based targets relative to one radar-based target is hereinafter termed "image-based multi-object combination" or simply "multi-object combination".

Figure 3:
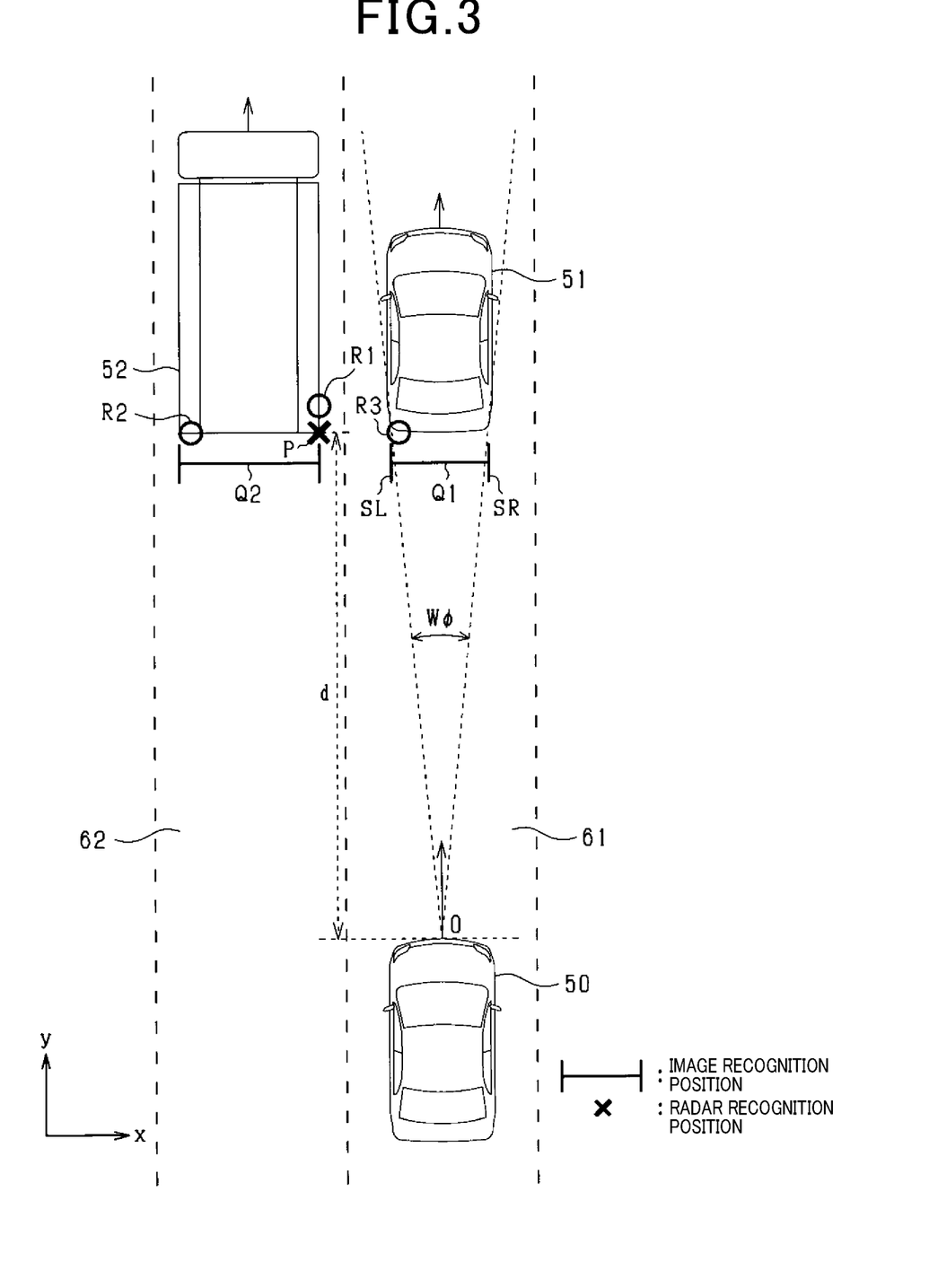
FIG. 3 is a diagram illustrating an embodiment of image-based multi-object combination.

Referring to FIG. 3, description will be given of the image-based multi-object combination according to the present embodiment. Similarly to FIG. 2, FIG. 3 shows a situation where the preceding vehicle 51 ahead of the own vehicle 50 runs parallel to the adjacent vehicle 52. R1 to R3, Q1, and Q2 of FIG. 3 are the same as those of FIG. 2.

The fusion calculation unit 23 acquires information on the plurality of reflection points R1 to R3 detected by the radar device 31 from the radar-based target detection unit 21, and extracts a right-end reflection point, which is a reflection point located at the right end in the lateral direction of the own vehicle 50, and a left-end reflection point, which is similarly a reflection point located at the left end, from the acquired plurality of reflection points R1 to R3. Then, it is determined whether a plurality of objects have been detected as a single object by the radar device 31, based on the positional relationship between at least one of the extracted right- and left-end reflection points and the image-only target. In the present embodiment, the fusion calculation unit 23 serves as an object determining unit, an information combining unit, a vehicle condition determining unit, a distance determining unit, and a vehicle width calculating unit.

Specifically, in FIG. 3, of the plurality of reflection points R1 to R3, R3 is the right-end reflection point, and R2 is the left-end reflection point. Of these points, the right-end reflection point R3 overlaps with the image recognition position Q1 of the preceding vehicle 51 in the lateral direction of the own vehicle 50. Further, since the representative point P is calculated by grouping the plurality of reflection points R1 to R3, it can be said that the information of the representative point P is affected by the preceding vehicle 51. Therefore, the fusion calculation unit 23 combines a millimeter wave distance d, which is the distance information of the object detected by the radar device 31, with the image angle width Wφ, which is the lateral position information of the object detected by the imaging device 32, to generate a fusion target corresponding to the preceding vehicle 51.

Referring to the flow diagram of FIG. 4, description will be given of a procedure of a multi-object combination determination process. The process shown in FIG. 4 is cyclically executed by the fusion calculation unit 23 of the object recognition apparatus 20.

Figure 4:
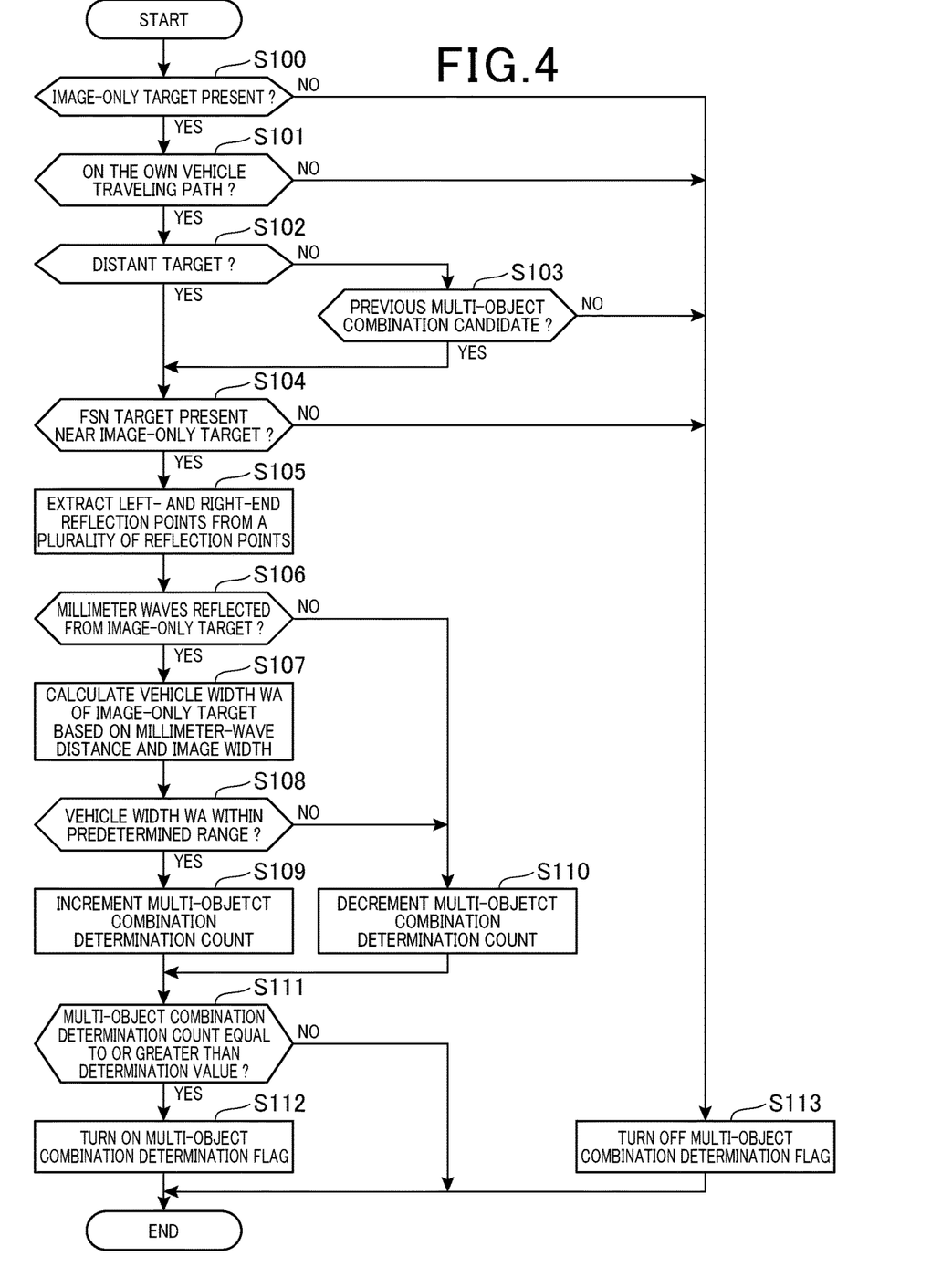
FIG. 4 is a flow diagram illustrating a procedure of a determination process for image-based multi-object combination.

As shown in FIG. 4, at step S100, it is determined whether there is an image-only target in the image-based targets detected by the imaging device 32. If there is an image-only target, control proceeds to step S101 where it is determined whether the image-only target is on the traveling path of the vehicle 50. If the lane line of the own lane 61 has been recognized by the imaging device 32, the above determination is made depending on whether the image-only target is in the own lane 61. If the lane line of the own lane 61 has not been recognized by the imaging device 32, a predicted path of the own vehicle 50 is calculated, for example, and the above determination is made depending on whether there is an image-only target on the predicted path.

If a positive determination is made at step S101, control proceeds to step S102 where it is determined whether the image-only target on the own vehicle traveling path is a distant target that is distanced from the own vehicle 50 by a predetermined distance or more. If it is determined that the object is not a distant target that is distanced by a predetermined distance or more, control proceeds to step S103 where it is determined whether the image-only target is a previous multi-object combination candidate. The multi-object combination candidate refers to a candidate target among a plurality of image-based targets each being a candidate for fusion with one radar-based target. If the image-only target on the own vehicle traveling path is determined to be a previous multi-object combination candidate, or if the image-only target on the own vehicle traveling path is determined to be a distant target that is distanced by a predetermined distance or more, control proceeds to S104.

At step S104, it is determined whether a fusion target (also termed FSN target) is present near the image-only target. At this step, it is determined whether the image-based target that has been used for fusion with the radar-based target is present within a predetermined range from the image-only target. Specifically, if the difference in distance between the image-based target that has been used for fusion with the radar-based target and the image-only target is less than a predetermined value Δd and if a lateral position difference between them is less than a predetermined value Δx, an FSN target is determined to be present near the image-only target. The fusion target herein refers to a combination of a radar-based target and an image-based target having an overlap spanning over the radar search region and the image search region. In FIG. 3, the target generated based on the radar-based target at the representative point P and the image-based target of the adjacent vehicle 52 corresponds to the fusion target at step S104. If a positive determination is made at step S104, control proceeds to step S105 where a left- and right-end reflection points are extracted from the plurality of reflection points grouped when the representative point P is set.

At the subsequent step S106, it is determined whether there is a reflection of the electromagnetic waves transmitted from the radar device 31 (termed millimeter wave reflection hereinafter), from the object corresponding to the image-only target. At this step, if a left end SL of the image-only target is on the left of the right-end reflection point or if a right end SR thereof is on the right of the left-end reflection point, it is determined that there has been a millimeter wave reflection from the object corresponding to the image-only target. If a positive determination is made at step S106, control proceeds to step S107. When the image-only target is a vehicle, a vehicle width WA of the image-only target is calculated, at step S107, using the millimeter wave distance d detected by the radar device 31 and the image angle width Wφ that is azimuth angle information of the image-only target detected by the imaging device 32.

At the subsequent step S108, it is determined whether the vehicle width WA of the image-only target is within a predetermined range. It should be noted that when the distance between the image-only target and the radar-based target is excessively large, the vehicle width WA calculated using the millimeter wave distance d and the image angle width Wφ will be distorted, and the resultant vehicle width WA will be a value that is unreliable. Considering this, at step S108, if the vehicle width WA calculated using the distance information of the radar-based target and the width information of the image-only target is out of a predetermined range, the image-only target is not allowed to or less likely to be fused with the radar-based target. Specifically, if the determination made at step S108 is positive, control proceeds to step S109 where a multi-object combination determination counter CA is incremented. If a negative determination is made at step S108, the multi-object combination determination counter CA is decremented.

At the subsequent step S111, it is determined whether the count of the multi-object combination determination counter CA is equal to or greater than a determination value. If the count of the multi-object combination determination counter CA is equal to or greater than the determination value, control proceeds to S112 where a multi-object combination determination flag is turned on. The multi-object combination determination flag indicates whether a plurality of objects have been detected as a single object by the radar device 31, and is turned on if a plurality of objects are determined to have been detected as a single object. If "CA<determination value" is satisfied, the present routine is temporarily terminated. If there is no image-only target on the own vehicle traveling path, and if the image-only target is one that has suddenly appeared near the own vehicle 50, the multi-object combination determination flag is turned off at step S113.

Figure 5:
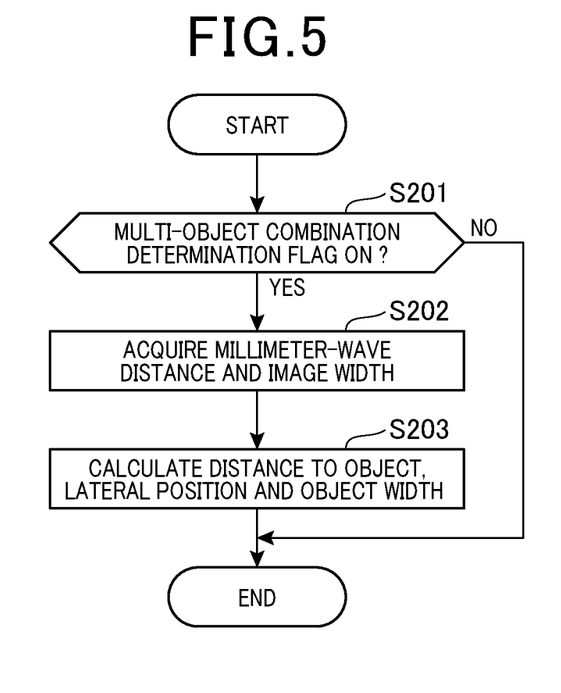
FIG. 5 is a flow diagram illustrating a procedure of an image-based multi-object combination process.

Referring to FIG. 5, description will be given of an image-based multi-object combination process for fusing an image-only target with a radar-based target. This process is cyclically executed by the fusion calculation unit 23 of the object recognition apparatus 20.

As shown in FIG. 5, at step S201, it is determined whether the multi-object combination determination flag is on. If the multi-object combination determination flag is on, control proceeds to step S202 where a millimeter-wave distance d is acquired from the radar-based target detection unit 21, and an image angle width Wφ is acquired from the image-based target detection unit 22 as azimuth angle information of the image-only target. At the subsequent step S203, the acquired millimeter-wave radar distance d is combined with the image angular width Wφ, and a distance, a lateral position, and an object width relative to the own vehicle 50 are calculated for the object detected on the own vehicle traveling path only based on image. Then, the driving assist ECU 10 terminates the present routine.

According to the present embodiment specifically described above, the following advantageous effects are obtained.

Information on a plurality of reflection points that have been grouped as reflections from a single object is acquired to use the information, together with image-based target information, as a basis for determining that a plurality of objects are detected as a single object by the radar device 31. Even when a plurality of vehicles running in parallel at a distance have caused reflections and the plurality of vehicles are erroneously detected as a single object by the radar device 31, if the plurality of objects have been detected by the imaging device 32 and a plurality of reflection points that have been grouped as reflections from a single object are related to a plurality of image-based targets, it may be determined that a plurality of objects have been detected as a single object by the radar device 31. Therefore, with the above configuration, it is accurately determined whether a plurality of objects have been detected as a single object by the radar device 31. Further, since a determination is made based on the combination of radar-based target information with image-based target information, the determination can be quickly made, following detection of an object by the radar device 31 and the image capturing device 32.

Specifically, the radar device 31 determines that a plurality of objects have been detected as a single object based on the positional relationship between at least one of the right-and left-end reflection points of the plurality of reflection points grouped as reflection from a single object, and the image-only target. According to such a configuration, a plurality of reflection points grouped as reflections from a single object are accurately determined to be related to an image-only target.

If it is determined that a plurality of objects have been detected as a single object by the radar device 31 based on reflection point information and image-based target information, azimuth angle information of the image-only target is combined with distance information of the radar-based target to generate a fusion target corresponding to the image-only target. Since the representative point P of the radar-based target is calculated from a plurality of reflection points grouped as reflections from a single object, when a plurality of objects are determined to have been detected as a single object by the radar device 31, the representative point P is estimated to be affected by the image-only target. In this regard, by fusing the image-only target and the radar-based target, the recognition accuracy of the object corresponding to the image-only target can be improved.

In the configuration set forth above, it is determined whether a plurality of objects have been detected as a single object by the radar device 31, under conditions that there is a combination of a radar-based target and an image-based target satisfying a predetermined positional relationship that is determined to indicate attribution to the same object, within a predetermined range from the image-only target. If it is determined that the image-only target is present and a plurality of objects have been detected as a single object by the radar device 31, an FSN target is estimated to be present near the image-only target. In this regard, use of the above configuration can reduce the risk of making an erroneous determination as to whether to perform image-based multi-object combination.

The radar device 31 determines whether a plurality of objects have been detected as a single object, wider conditions that the image-only target is an object on the traveling path of the own vehicle. By selecting image candidates for performing image-based multi-object combination from image-based targets on the own vehicle traveling path, erroneous determinations are minimized, and recognition accuracy is improved for a vehicle having a high degree of importance in performing driving support.

The radar device 31 determines whether a plurality of objects have been detected as a single object, under conditions that the distance to the image-only target from the own vehicle 50 (first vehicle) is equal to or greater than a predetermined distance. In the radar device 31, a plurality of objects tending to be detected as a single object are ones that are present in a distant area, and an object suddenly appearing at a short distance may be a ghost. In this regard, in the radar device 31, objects to be determined as to whether they have been incorrectly detected as a single object are selected to distant targets to minimize erroneous determinations.

When the image-only target is a second vehicle (another vehicle), the vehicle width WA of the second vehicle is calculated by combining the azimuth angle information of the image-only target and the distance information of the radar-based target. Under conditions that the calculated vehicle width WA is within a predetermined range, a plurality of objects are determined to have been detected as a single object by the radar device 31. If the vehicle width WA obtained by fusing the image-only target with the radar-based target reaches a value that is unreliable, the distance between the image-only target and the radar-based target is determined to be too large to be regarded as an identical object. In this regard, use of the above configuration can reduce the risk of erroneously making a determination as to whether to perform image-based multi-object combination.

Other Embodiments

The present disclosure is not limited to the embodiment set forth above, and may be implemented as follows, for example.

Figure 6:
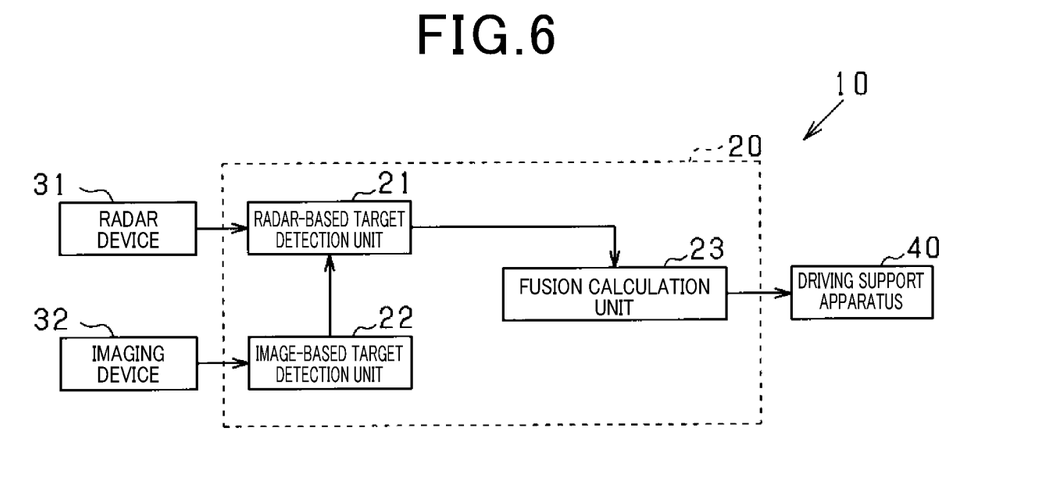
FIG. 6 is a schematic block diagram illustrating a configuration of a driving support system according to another embodiment.

In the configuration described above, the fusion calculation unit 23 serves as an object determining unit. Alternatively, however, the radar-based target detection unit 21 may serve as an object determining unit. Specifically, as shown in FIG. 6, the radar-based target detection unit 21 of the object recognition apparatus 20 may receive distance measurement data including reflection point information from the radar device 31, and may acquire an image-based target from the image-based target detection unit 22. Further, the radar-based target detection unit 21 may determine that a plurality of objects have been detected as a single object by the radar device 31 based on the acquired reflection point information and the information of the image-based target. If a plurality of objects have been detected as a single object by the radar device 31, correction may be made for the grouping of a plurality of reflection points as reflections from a single object. For example, in FIG. 3, the reflection points R1 and R2 overlapping with the image recognition position Q2 of the adjacent vehicle 52 may be combined into one group, and the reflection point R3 overlapping with the image recognition position Q1 of the preceding vehicle 51 may be combined into one group. In addition, a representative point may be set for each group, and information on the representative point and image-based target information acquired from the image-based target detection unit 22 may be outputted to the fusion calculation unit 23. The fusion calculation unit 23 may fuse the information on the representative point with the image-based target information to generate a fusion target. In the case of FIG. 3, a fusion target corresponding to the preceding vehicle 51 and a fusion target corresponding to the adjacent vehicle 52 may be generated.

In the configuration of FIG. 6, the fusion calculation unit 23 may generate a fusion target by using the information on one representative point and image-based target information, without correcting grouping. The control unit 31*b* of the radar device 31 may serve as an object determining unit.

Based on the reflection point information and the image-based target information, if a plurality of objects are determined to have been detected as a single object by the radar device 31, the vehicle 50 may be slowly accelerated or moderately decelerated in the inter-vehicle distance control for making the inter-vehicle distance between the vehicle 50 and the preceding vehicle 51 constant. With such a configuration, time is ensured for the radar device 31 to detect the preceding vehicle 51, and a fusion target can be generated before the own vehicle 50 approaches the preceding vehicle 51.

In the above embodiment, the radar device 31 determines that a plurality of objects have been detected as a single object on the basis of the reflection point information and the image-based target information, under conditions that the image-only target is present on the own vehicle traveling path. However, the present disclosure is not limited to the case of an image-only target being present on the own vehicle traveling path. For example, the above determination process may be implemented when an image-only target is present on the adjacent lane 62.

In the above embodiment, a plurality of objects are determined to have been detected as a single object by the radar device 31 based on reflection point information and image-based target information, under conditions that an image-only target is a distant target that is distanced from the own vehicle 50 by a predetermined distance or more. However, the above determination process may be implemented regardless of whether the image-only target is a distant target. The above determination process may be implemented regardless of whether the vehicle width WA of an image-only target is within a predetermined range.

The components set forth above are conceptual and are not limited to the above embodiment. For example, the functions of one component may be distributed as plural components, and the functions that plural components have may be combined into one component.

The present disclosure has been described by way of examples; however, the present disclosure should not be construed as being limited to such examples or structures. The present disclosure should encompass various modifications or alterations within the range of equivalents. In addition, various combinations and modes, as well as other combinations and modes, including those which include one or more additional elements, or those which include fewer elements should be considered to be in the scope and spirit of the present disclosure.

The invention claimed is:

1. An object recognition apparatus that recognizes an object around an own vehicle which is a first vehicle, based on a radar-based target and an image-based target, a radar-based target being detected using a plurality of reflection points that are detected by a radar device, and an image-based target being detected from an image captured by an imaging device, the object recognition apparatus comprising:
    a memory having a set of computer-executable instructions stored thereon;
    a processor communicable with the memory, the radar device, the imaging device, and a driving support apparatus; and
    the set of computer-executable instructions stored on the memory cause the processor to implement:
        acquiring reflection point information related to the plurality of reflection points; and
        determining whether an image-only target exists in image-based targets that are detected by the imaging device, the image-only target comprising an image-based target that is not detected by the radar device;
        for a state in which the image-only target is a second vehicle, combining azimuth angle information of the image-only target with distance information of the radar-based target to calculate a vehicle width of the second vehicle; and
    determining whether the radar device has detected a plurality of objects as a single object, based on the reflection point information and information of the image-based target, in response to the image-based target comprising an image-only target that is not detected by the radar device, wherein
    the radar device is determined to have detected the plurality of objects as the single object based on the vehicle width of the second vehicle being within a predetermined range,
    the processor generates a fusion target by combining the radar-based target and the image-only target in response to determining that the radar device has detected the plurality of objects as the single object, and outputs information related to the generated fusion target to the driving support apparatus for implementing a driving support control based on the fusion target, and
    the driving support control is implemented by controlling a brake device, a steering device, a seat belt activation device, or an alarm device.

2. The object recognition apparatus according to claim 1, wherein
    the processor determines that the plurality of objects have been detected as the single object by the radar device, based on a positional relationship between the image-only target and at least either of a right-end reflection point located at a right end and a left-end reflection point located at a left end in a lateral direction of the own vehicle.

3. The object recognition apparatus according to claim 1, wherein
    for a state in which the processor determines that the plurality of objects have been detected as the single object by the radar device, combined target information is generated as information of the object by combining azimuth angle information of the image-only target with distance information of the radar-based target.

4. The object recognition apparatus according to claim 1, wherein:
    the set of computer-executable instructions stored on the memory cause the processor to implement generating combined target information as information of an object by combining radar-based target information with image-based target information on the basis of a combination of the radar-based target and the image-based target for a state in which such a combination is present among radar-based targets detected by the radar device and image-based targets detected by the imaging device, the radar-based target and the image-based target satisfying a predetermined positional relationship that is determined to indicate attribution to the same object; and the processor determines that the plurality of objects have been detected as the single object by the radar device, under conditions that there is a combination of the radar-based object and the image-based target satisfying the predetermined positional relationship, and the image-based target in the combination is present within a predetermined range from the image-only target.

5. The object recognition apparatus according to claim 1, wherein:

the set of computer-executable instructions stored on the memory cause the processor to implement determining whether the image-only target is on a traveling path of the own vehicle; and the processor determines that the plurality of objects have been detected as the single object by the radar device, under conditions that the image-only target has been determined to be on the traveling path of the own vehicle.

6. The object recognition apparatus according to claim 1, wherein:

the set of computer-executable instructions stored on the memory cause the processor to implement determining whether a distance to the image-only target from the own vehicle is a predetermined distance or more; and the processor determines that the plurality of objects have been detected as the single object by the radar device, under conditions that the distance to the image-only target from the own vehicle has been determined to be a predetermined distance or more.

7. An object recognition method that recognizes an object around an own vehicle which is a first vehicle, based on a radar-based target and an image-based target, a radar-based target being detected using a plurality of reflection points grouped by a radar device, and an image-based target being detected using an image captured by an imaging device, the object recognition method comprising:

acquiring reflection point information related to the plurality of reflection points;

determining whether an image-only target exists in image-based targets that are detected by the imaging device, the image-only target comprising an image-based target that is not detected by the radar device;

for a state in which the image-only target is a second vehicle, combining azimuth angle information of an image-only target with distance information of the radar-based target to calculate a vehicle width of the second vehicle;

determining whether the radar device has detected a plurality of objects as a single object, based on the reflection point information and information of the image-based target, in response to the image-based target comprising an image-only target that is not detected by the radar device, wherein the radar device is determined to have detected the plurality of objects as a single object based on the vehicle width of the second vehicle being within a predetermined range;

generating a fusion target by combining the radar-based target and the image-only target in response to determining that the radar device has detected the plurality of objects as the single object;

outputting information related to the generated fusion target to a driving support apparatus for implementing a driving support control based on the fusion target; and, implementing, using the driving support apparatus, the driving support control by controlling a brake device, a steering device, a seat belt activation device, or an alarm device.

8. An object recognition system that recognizes objects around an own vehicle which is a first vehicle, based on a radar-based target and an image-based target, the object recognition system comprising:

a radar device configured to transmit transmission waves and receive reflected waves reflected by objects around the own vehicle, detect a plurality of reflection points based on the reflected waves and identify the radar-based target by grouping together the plurality of reflection points;

an imaging device configured to capture images around the own vehicle; and an object recognition apparatus comprising:
a memory having a set of computer-executable instructions stored thereon; and
a processor communicable with the memory, the radar device, the imaging device; and
the set of computer-executable instructions stored on the memory cause the processor to implement:

acquiring reflection point information related to the plurality of reflection points;

identifying image-based targets by analyzing the images captured by the imaging device;

determining whether an image-only target exists in the image-based targets that are detected by the imaging device, the image-only target comprising an image-based target that is not detected by the radar device;

for a state in which the image-only target is a second vehicle, combining azimuth angle information of the image-only target with distance information of the radar-based target to calculate a vehicle width of the second vehicle; and determining whether the radar device has detected a plurality of objects as a single object, based on the reflection point information and information of the image-based target, in response to the image-based target comprising an image-only target that is not detected by the radar device, wherein the radar device is determined to have detected the plurality of objects as the single object based on the vehicle width of the second vehicle being within a predetermined range.

9. The object recognition system according to claim 8, wherein the processor determines that the plurality of objects have been detected as the single object by the radar device, based on a positional relationship between the image-only target and at least either of a right-end reflection point located at a right end and a left-end reflection point located at a left end in a lateral direction of the own vehicle.

10. The object recognition system according to claim 8, wherein for a state in which the processor determines that the plurality of objects have been detected as the single object by the radar device, combined target information is generated as information of the object by combining azimuth angle information of the image-only target with distance information of the radar-based target.

11. The object recognition system according to claim 8, wherein:
the set of computer-executable instructions stored on the memory cause the processor to implement generating combined target information as information of an object by combining radar-based target information with image-based target information on the basis of a combination of the radar-based target and the image-based target for a state in which such a combination is present among radar-based targets detected by the radar device and image-based targets detected by the imaging device, the radar-based target and the image-based target satisfying a predetermined positional relationship that is determined to indicate attribution to the same object; and
the processor determines that the plurality of objects have been detected as the single object by the radar device, under conditions that there is a combination of the radar-based object and the image-based target satisfying the predetermined positional relationship, and the image-based target in the combination is present within a predetermined range from the image-only target.

12. The object recognition system according to claim 8, wherein:
the set of computer-executable instructions stored on the memory cause the processor to implement determining whether the image-only target is on a traveling path of the own vehicle; and
the processor determines that the plurality of objects have been detected as the single object by the radar device, under conditions that the image-only target has been determined to be on the traveling path of the own vehicle.

13. The object recognition system according to claim 8, wherein:
the set of computer-executable instructions stored on the memory cause the processor to implement determining whether a distance to the image-only target from the own vehicle is a predetermined distance or more; and
the processor determines that the plurality of objects have been detected as the single object by the radar device, under conditions that the distance to the image-only target from the own vehicle has been determined to be a predetermined distance or more.

14. The object recognition system according to claim 8, wherein:
the processor generates a fusion target by combining the radar-based target and the image-only target in response to determining that the radar device has detected the plurality of objects as the single object, and outputs information related to the generated fusion target to a driving support apparatus for implementing a driving support control based on the fusion target.

15. The object recognition system according to claim 14, further comprising:
at least one of a brake device, a steering device, a seat belt activation device, and an alarm device, wherein
the driving support control is implemented by controlling the at least one of the brake device, the steering device, the seat belt activation device, or the alarm device.

16. An object recognition method that recognizes an object around an own vehicle which is a first vehicle, the object recognition method comprising:
transmitting, from a radar device, transmission waves and receiving, via the radar device, reflected waves reflected by objects around the own vehicle;
detecting, using the radar device, a plurality of reflection points based on the reflected waves received by the radar device;
identifying, using the radar device, a radar-based target by grouping together the plurality of reflection points;
acquiring reflection point information related to the plurality of reflection points;
capturing, from an imaging device, images around the own vehicle;
identifying image-based targets by analyzing the images captured by the imaging device;
determining whether an image-only target exists in image-based targets that are detected by the imaging device, the image-only target comprising an image-based target that is not detected by the radar device;
for a state in which the image-only target is a second vehicle, combining azimuth angle information of an image-only target with distance information of the radar-based target to calculate a vehicle width of the second vehicle;
determining whether the radar device has detected a plurality of objects as a single object, based on the reflection point information and information of the image-based target, in response to the image-based target comprising an image-only target that is not detected by the radar device, wherein the radar device is determined to have detected the plurality of objects as a single object based on the vehicle width of the second vehicle being within a predetermined range;
generating a fusion target by combining the radar-based target and the image-only target in response to determining that the radar device has detected the plurality of objects as the single object;
outputting information related to the generated fusion target to a driving support apparatus for implementing a driving support control based on the fusion target; and
implementing, using the driving support apparatus, the driving support control by controlling a brake device, a steering device, a seat belt activation device, or an alarm device.

* * * * *